June 24, 1924.
G. P. HAYNES
1,499,107
COUPLING FOR LIQUID FUEL BURNERS
Filed June 12, 1923
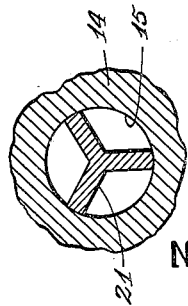
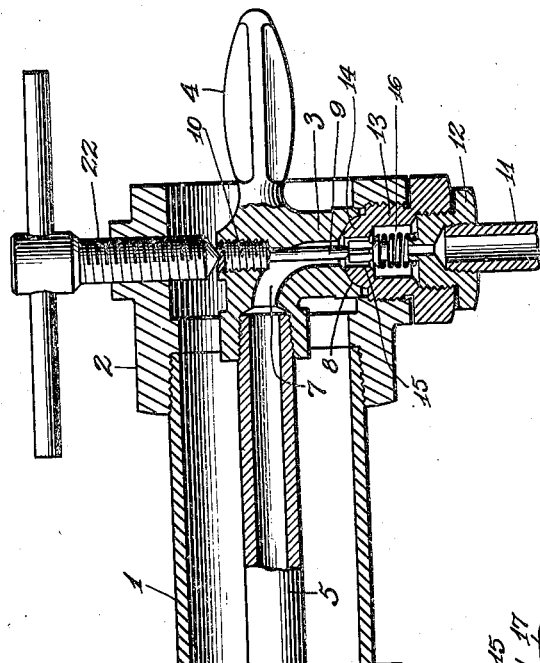
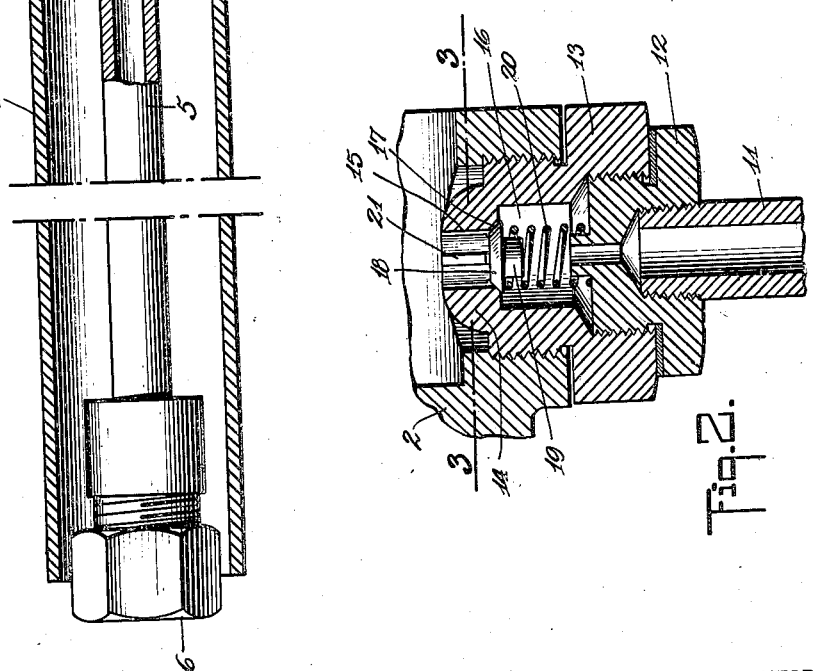
INVENTOR
George P. Haynes
BY
Frederick W. Barker
ATTORNEY Patented June 24, 1924.

1,499,107

UNITED STATES PATENT OFFICE.

GEORGE P. HAYNES, OF NEW YORK, N. Y., ASSIGNOR TO TODD SHIPYARDS CORPORATION, OF NEW YORK, N. Y., A CORPORATION OF NEW YORK.

COUPLING FOR LIQUID-FUEL BURNERS.

Application filed June 12, 1923. Serial No. 644,826.

*To all whom it may concern:*

Be it known that I, GEORGE P. HAYNES, a citizen of the United States, and resident of the borough of Manhattan, in the city, county, and State of New York, have invented certain new and useful Improvements in Couplings for Liquid-Fuel Burners, of which the following is a specification.

This invention relates to burners for use with liquid fuel furnaces, and my improvements are particularly directed to novel means for coupling the burner to the service line, these means being characterized as automatically opening communication between the service line and burner tube in the act of effecting the coupling, against the pressure of liquid fuel in the service line, which normally, operates to close the service line.

Other features and advantages of my invention will hereinafter appear.

In the drawing:

Figure 1 is a longitudinal sectional view of a burner showing my improved coupling means whereby it is connected up with the pressure supply of liquid fuel.

Fig. 2 is an enlarged, detail sectional view of the pressure closed valve and its associated elements, and Fig. 3 is a section on the line 3—3 of Fig. 2.

In said views let 1 indicate a burner jacket, which is provided with an external screw thread at one end to receive a cylindrical housing 2. A coupling element 3, having a handle 4, is adapted to enter axially within the housing, and at its forward portion carries a burner tube 5, which is provided with the usual tip 6.

The coupling element is provided with an angular, or curved passage 7 that opens at one end into the burner tube, said passage, as angled or curved, having its other opening in a plane transverse to the burner axis, and disposed centrally of a concave or inverted cup-shaped seat 8. A pin or plunger 9, adjustably secured as by a threaded portion 10 in the coupling element 3, opposite the opening through seat 8, is extended at its free end through said opening in order that it may project beyond the base of the seat.

The service pipe 11 is entered at its delivery end in a bushing 12, which itself is screwed into a chambered union or male member 13, that is screwed into the housing 2, said union having a terminal dome-like portion 14 of convex surface formation, which is adapted to fit in liquid-tight contact with the seat 8.

The dome-like portion 14 is pierced with an axial orifice 15, which continues into the chamber 16 provided in union 13, a valve 17 being provided at the inner perimeter or orifice 15 to receive a valve 18. This valve has a rearward stem 19 to center a helical spring 20 which lies between the valve 18 and bushing 12, to hold the valve to its seat when there is no pressure in the service pipe. Also the valve carries, at its forward face, a detent 21 of suitable form, that fits slidably in the bore or orifice 15 provided in the dome-like portion 14. This detent is here shown as composed of radial wings, whose center, when the coupling is fitted in the housing, is opposed to the pin or plunger 9.

A housing screw 22, threaded into the housing 2, is adapted to engage the coupling at a point in axial alignment with plunger 9 and detent 21, in such manner that, with the parts assembled, an inward screwing action of the housing screw, to bind the coupling against the union 13, also has the effect of causing plunger 9 to depress detent 21, thereby releasing valve 18 from its seat against the pressure of liquid fuel in the service pipe, and, with the coupling then firmly seated and engaged, presenting a clear passage therethrough for the flow of liquid fuel from the service pipe to the burner tube.

For localizing purposes, the housing screw may have a conical tip, and the coupling, or the portion 10 of the plunger which is threaded into the coupling, may have a complementary depression to receive said tip, to thus assure the true axial relation of the plunger, as well as to enable the concave surface 8 to properly co-act with the dome-like portion 14.

Heretofore, with coupling devices for liquid fuel burners, it has been necessary to shut off the pressure supply at the service pipe before disengaging the coupling, because otherwise a rush of hot oil would issue from the union; and sometimes the attendant would forget to shut it off. But, with my present improvement, such neglect is of no consequence, since the mere act of withdrawing the housing screw releases the plunger 9 and permits the service pressure to automatically close the valve 18. Then, again, in inserting a coupling, and tightening up the housing screw, the valve thereby becomes unseated and the pressure of liquid fuel is supplied to the burner.

Variations within the spirit and scope of my invention are equally comprehended by the foregoing disclosure.

I claim:

1. The combination with a liquid fuel burner having a jacket, a housing engaged therewith, a housing screw, and a coupling adapted to connect the burner tube with a pressure service pipe, of means provided at the end of the service pipe for normally closing said pipe under the service pressure, and means carried by the coupling, to engage and open the service pipe closing means, thereby admitting liquid fuel to the burner tube, said coupling carried means being engageable by said housing screw in the tightening action thereof.

2. The combination with a liquid fuel burner having a jacket, a housing engaged therewith, a housing screw and a coupling adapted to connect the burner tube with a pressure service pipe, of a chambered union engaging the service pipe, a valve adapted to seat in said union under service pressure, and a plunger carried by said coupling, said plunger lying axially between said housing screw and valve, whereby said plunger in the operation of tightening the housing screw to unite the coupling and union, serves to engage and unseat the valve and thus open communication from the service pipe to the burner tube.

3. The combination with a liquid fuel burner, having a jacket, a housing engaged therewith, a housing screw and a coupling adapted to connect the burner tube with a service pressure pipe, of a chambered union engaging the service pipe, a valve adapted to seat in said union under service pressure, a plunger threaded into said coupling, with its free end extended beyond the surface of the coupling and aligned with the housing screw, said plunger at its threaded end constituting a seat for the housing screw, whereby in the operation of tightening the housing screw to unite the coupling in union, the free end of the plunger is caused to engage and unseat the valve and thus open communication from the service pipe to the burner tube.

Signed at the borough of Manhattan, in the city, county, and State of New York, this 11th day of June, A. D. 1923.

GEORGE P. HAYNES.